United States Patent
Flärdh et al.

(10) Patent No.: US 11,773,799 B2
(45) Date of Patent: Oct. 3, 2023

(54) CONTROL DEVICE AND METHOD FOR STARTING A COMBUSTION ENGINE DURING FREE-WHEELING A VEHICLE WITH SUCH DEVICE, COMPUTER PROGRAM FOR EXECUTING THE METHOD AND COMPUTER READABLE MEDIUM CONTAINING THE PROGRAM

(71) Applicant: Scania CV AB, Södertälje (SE)

(72) Inventors: Oscar Flärdh, Älvsjö (SE); Fredrik Roos, Segeltorp (SE); Mikael Zemowski, Huddinge (SE); Georg Åhrberg, Huddinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/642,755

(22) PCT Filed: Sep. 23, 2020

(86) PCT No.: PCT/SE2020/050892
§ 371 (c)(1),
(2) Date: Mar. 14, 2022

(87) PCT Pub. No.: WO2021/066704
PCT Pub. Date: Apr. 8, 2021

(65) Prior Publication Data
US 2022/0333541 A1    Oct. 20, 2022

(30) Foreign Application Priority Data
Oct. 2, 2019    (SE) .................................... 1951119-5

(51) Int. Cl.
*F02D 41/06* (2006.01)
*B60W 10/02* (2006.01)
(Continued)

(52) U.S. Cl.
CPC ........... *F02D 41/062* (2013.01); *B60W 10/02* (2013.01); *B60W 10/06* (2013.01);
(Continued)

(58) Field of Classification Search
CPC ................. F02D 41/062; F02D 31/007; F02D 2200/101; B60W 10/02; B60W 10/06;
(Continued)

(56) References Cited

U.S. PATENT DOCUMENTS

2012/0150371 A1    6/2012    Swales et al.
2017/0183010 A1*   6/2017    Theel ........................ F02N 5/04
(Continued)

FOREIGN PATENT DOCUMENTS

DE    202015005812 U1    12/2016
DE    102015016964 A1    6/2017
(Continued)

OTHER PUBLICATIONS

Scania CV AB, International Patent Application No. PCT/SE2020/050892, International Search Report, dated Oct. 2, 2020.
(Continued)

*Primary Examiner* — Edwin A Young
(74) *Attorney, Agent, or Firm* — Moore & Van Allen PLLC; W. Kevin Ransom

(57) ABSTRACT

A method, performed by a control device, for starting a combustion engine during free-wheeling with engine off is described. The method comprises a step of controlling the clutch to a partially closed state, thereby starting the combustion engine; a step of controlling the clutch to an open state when the combustion engine has started, but prior to the output shaft of the combustion engine has reached a rotational speed synchronized with the rotational speed of the input shaft of the gearbox; and a step of synchronizing the speed of the combustion engine to the speed of the input (Continued)

shaft of the gearbox through control of fuel injection to the combustion engine.

17 Claims, 4 Drawing Sheets

(51) Int. Cl.
*B60W 10/06* (2006.01)
*B60W 30/18* (2012.01)
*F02D 31/00* (2006.01)

(52) U.S. Cl.
CPC ..... *B60W 30/18172* (2013.01); *F02D 31/007* (2013.01); *B60W 2510/0638* (2013.01); *B60W 2510/104* (2013.01); *F02D 2200/101* (2013.01)

(58) Field of Classification Search
CPC ..... B60W 30/18172; B60W 30/18072; B60W 30/192; B60W 2510/0638; B60W 2510/104
See application file for complete search history.

(56) References Cited

U.S. PATENT DOCUMENTS

| | | |
|---|---|---|
| 2017/0282920 A1 | 10/2017 | Ortseifen et al. |
| 2018/0080425 A1* | 3/2018 | Ose .................. F02N 5/04 |
| 2018/0257654 A1* | 9/2018 | Tashiro ............ F02D 29/02 |
| 2018/0362020 A1 | 12/2018 | Kobler et al. |
| 2019/0031171 A1* | 1/2019 | Iwamoto ........... B60W 10/02 |

FOREIGN PATENT DOCUMENTS

| | | |
|---|---|---|
| EP | 2497940 A2 | 9/2012 |
| EP | 2884083 A1 | 6/2015 |
| GB | 2358845 A | 8/2001 |
| SE | 1251097 A1 | 9/2013 |
| SE | 1750353 A1 | 9/2018 |
| WO | 2017089200 A1 | 6/2017 |
| WO | 2017202419 A1 | 11/2017 |

OTHER PUBLICATIONS

Scania CV AB, International Patent Application No. PCT/SE2020/050892, Written Opinion, dated Oct. 2, 2020.
Scania CV AB, International Patent Application No. PCT/SE2020/050892, International Preliminary Report on Patentability, dated Apr. 5, 2022.

* cited by examiner

CONTROL DEVICE AND METHOD FOR STARTING A COMBUSTION ENGINE DURING FREE-WHEELING A VEHICLE WITH SUCH DEVICE, COMPUTER PROGRAM FOR EXECUTING THE METHOD AND COMPUTER READABLE MEDIUM CONTAINING THE PROGRAM

CROSS-REFERENCE TO RELATED APPLICATIONS

This application is a National Stage patent application (filed under 35 § U.S.C. 371) of PCT/SE2020/050892, filed Sep. 23, 2020 of the same title, which, in turn claims priority to Swedish Patent Application No. 1951119-5 filed Oct. 2, 2019 of the same title; the contents of each of which are hereby incorporated by reference.

FIELD OF THE INVENTION

The present disclosure relates in general to method for starting a combustion engine of a vehicle powertrain during free-wheeling with engine off. The present disclosure further relates in general to a control device configured to start a combustion engine of a vehicle powertrain during free-wheeling with engine off, and a vehicle comprising such a control device. The present disclosure further relates in general to a computer program and a computer-readable medium.

BACKGROUND OF THE INVENTION

The continuous strive of vehicle manufactures to reduce fuel consumption has led to a desire to be able to reduce the speed of the combustion engine to a minimum, typically idle speed, in situations where no driving torque is necessary for continued travel of the vehicle. An example of a situation where no driving torque is necessary for continued travel of the vehicle may be during downhill travel. A reduction of the speed of the combustion engine to a minimum in such situations may be achieved by opening the vehicle powertrain, either by opening the clutch or putting the gearbox in neutral, so as to avoid engine braking which would occur if the vehicle powertrain would be closed. This operation mode of the vehicle powertrain is sometimes referred to as free-wheeling and is commonly implemented in heavy vehicles today.

By shutting down the combustion engine when there is no need for a driving torque to be transferred to the driving wheels, instead of running the combustion engine at idle speed as described above, even more fuel can be saved. Such an operation mode may be referred to as free-wheeling with engine off.

Free-wheeling with engine off requires that the combustion engine can be quickly and efficiently started when there is a need for transferring driving torque to the driving wheels again. The combustion engine may for example be started by means of starting systems adapted therefore. However, available starting systems are either insufficient to handle the high number of starts required in order to implement free-wheeling with engine off and/or come at a high expense.

Alternatively, the combustion engine may be started using the clutch. Thereby, it is possible to avoid the extra cost for an upgraded, more durable, starter system that could handle the high number of starts required. Start of the combustion engine by means of the clutch is achieved by partially closing the clutch so as to transfer torque from the input shaft of the gearbox to the output shaft of the combustion engine, thereby dragging the combustion engine.

Starting the combustion engine using the clutch has however two major drawbacks. The first drawback is clutch wear. Albeit an engine start only imparts a moderate clutch wear, the life length of the clutch may be significantly reduced due to the high total number of starts of the combustion engine required if free-wheeling with engine off is implemented. The second drawback is handling effects. Since the energy required to start the combustion engine using the clutch is taken from the drive wheel, the start of the combustion engine thus results in a braking force on the drive wheels. This might in turn, in some situations, affect the lateral stability of the vehicle. Therefore, it is important to have a start procedure that results in minimum wear of the clutch and force on the driving wheels.

EP 2 497 940 A2 discloses an example of a method for starting a combustion engine using the clutch in connection with freewheeling. The method comprises controlling the clutch in three different steps. In the first step, the clutch is controlled from its open state with a first torque gradient until its clutch torque exceeds the drag torque of the combustion engine. In the second step, the clutch is controlled with a second torque gradient until rotational speed of the combustion engine exceeds a resonance rotational speed of a two-mass flywheel that is arranged between the clutch and an output shaft of the combustion engine. In the third step, the clutch is completely closed so that the speed of the combustion engine is matched with an input-sided rotational speed of a transmission in a jump-free manner.

SUMMARY OF THE INVENTION

The object of the present invention is to address the problem of the high number of starts of the combustion engine required if fully implementing free-wheeling with engine off by providing an efficient and reliable start of the combustion engine in conjunction with free-wheeling with engine off.

The object is achieved by means of the subject-matter of the appended independent claims.

In accordance with the present disclosure, a method for starting a combustion engine of a vehicle powertrain during free-wheeling with engine off is provided. The method is performed by a control device. The vehicle powertrain comprises a combustion engine comprising an output shaft. The vehicle powertrain further comprises a gearbox arranged to selectively transfer torque between the combustion engine and at least one driving wheel, the gearbox comprising an input shaft. The vehicle powertrain further comprises a clutch arranged between the combustion engine and the gearbox. The clutch is connected to the input shaft of the gearbox and the output shaft of the combustion engine. The method comprises the steps of:

in response to an instruction for start of the combustion engine, controlling the clutch to a partially closed state so as to transfer torque from the input shaft of the gearbox to the combustion engine, thereby starting the combustion engine;

when the combustion engine has started, but prior to the output shaft of the combustion engine has reached a rotational speed synchronized with the rotational speed of the input shaft of the gearbox, controlling the clutch to an open state; and synchronizing the speed of the combustion engine to the speed of the input shaft of the gearbox through control of fuel injection to the combustion engine.

In accordance with the method according to the present disclosure, the combustion engine is started by means of the clutch and there is therefore no need for a separate or upgraded starting system for starting the combustion engine in conjunction with free-wheeling with engine off. Therefore, the load on a starter system adapted to start the combustion engine, if present, is reduced. Such a starter system may be used only for starting the combustion engine when the vehicle has been at standstill with engine off.

Furthermore, by means of the present method, the wear of the clutch is reduced since the clutch is only used for a part of the starting sequence. More specifically, in contrast to previously known methods, the clutch is not partially (or fully) engaged during the whole starting sequence leading up to a rotational speed of the combustion engine at which the clutch can be fully engaged and the torque from the combustion engine transmitted to the driving wheels. Instead, the clutch will be opened after the combustion engine has started, but prior to the combustion engine has reached the rotational speed at which it is synchronized with the rotational speed of the input shaft of the gearbox.

The present method also has the advantage of significantly reducing the risk of loss of lateral stability during the starting sequence of the combustion engine. This is due to the energy transferred from the driving wheels in order to drag the combustion engine being considerably reduced as a result of opening of the clutch during a part of the starting sequence.

The step of controlling the clutch to an open state may be performed in response to an indication from a management system of the combustion engine that the combustion engine may be accelerated by control of fuel injection. This has the advantage of ensuring that the clutch can be safely opened without failure to start the combustion engine. In other words, it can be ensured that the clutch is opened only after sufficient torque has been transferred from the input shaft of the gearbox to the output shaft of the combustion engine to start the combustion engine. This in turn ensures a safe start of the combustion engine.

The step of controlling the clutch to an open state may be performed in response to an indication that the rotational speed of the combustion engine has reached a predetermined rotational speed threshold value. The rotational speed of the combustion engine can easily and quickly be determined by means of already present sensors normally utilised for the purpose of control of combustion engine. Therefore, an early indication of when the combustion engine has sufficient rotational speed to be accelerated by control of fuel injection can be determined. Therefore, the control of the clutch to an open state can be performed at an early stage of the starting sequence. This in turn further reduces the wear of the clutch.

The predetermined rotational speed threshold value may for example correspond to a rotational speed lower than, or equal to, the idle speed of the combustion engine. At idle speed, it is well known that the combustion engine may be accelerated by control of fuel injection. However, for the purpose of reducing the wear of the clutch and reduce the risk of problems with lateral stability, it is advantageous to open the clutch as early as possible. Therefore, the predetermined rotational speed threshold value could advantageously be lower than the idle speed.

The step of controlling the clutch to the open state may be initiated in response to an indication that a predetermined condition for opening of the clutch is fulfilled. This enables initiating the opening of the clutch as early as possible, which in turn further reduces the wear of the clutch and the risk of loss in lateral stability. The predetermined condition for opening of the clutch may be based on a prediction that the torque transferred to the combustion engine during opening of the clutch is sufficient for the combustion engine to reach a state at which it may be accelerated by control of fuel injection. Alternatively, or additionally, the predetermined condition for opening of the clutch may be based on a prediction that the time it takes to open the clutch is sufficiently long for the combustion engine to reach a state at which the combustion engine may be accelerated by control of fuel injection.

The step of controlling the clutch to a partially closed state may be performed to a predetermined transfer torque. Thereby, it may be ensured that the torque transferred from the input shaft of the gearbox to the combustion engine is sufficient to drag the combustion engine. This in turn increases the reliability of the start of the combustion engine.

The step of controlling the clutch to the open state may be performed after an indication that a first fuel injection to the combustion engine has occurred. Thereby, the risk of the clutch being opened too early during the starting sequence may be minimized. This in turn increases the reliability of the start of the combustion engine.

The method may further comprise a step of, when the rotational speed of the output shaft of the combustion engine is synchronized to the speed of the input shaft of the gearbox, controlling the clutch from the open state to a closed state. Thereby, driving torque from the combustion engine may be fully transferred to the driving wheels of the vehicle powertrain when the free-wheeling operation with engine off has been terminated.

The present disclosure further relates to a computer program comprising instructions, which when executed by a control device, cause the control device to perform the method for starting a combustion engine of a vehicle powertrain during free-wheeling with engine off as described above.

The present disclosure further relates to a computer-readable medium comprising instructions, which when executed by a control device, cause the control device to perform the method for starting a combustion engine of a vehicle powertrain during free-wheeling with engine off as described above.

Furthermore, in accordance with the present disclosure, a control device configured to start a combustion engine of a vehicle powertrain during free-wheeling with engine off is provided. The vehicle powertrain comprises a combustion engine comprising an output shaft. The vehicle powertrain further comprises a gearbox arranged to selectively transfer torque between the combustion engine and at least one driving wheel, the gearbox comprising an input shaft. The vehicle powertrain further comprises a clutch arranged between the combustion engine and the gearbox. The clutch is connected to the input shaft of the gearbox and the output shaft of the combustion engine. The control device is configured to, in response to an instruction to start the combustion engine, control the clutch to a partially closed state so as to transfer torque from the input shaft of the gearbox to the combustion engine, thereby starting the combustion engine. The control device is further configured to control the clutch to an open state when the combustion engine has started, but prior to the output shaft of the combustion engine has reached a rotational speed synchronized with the rotational speed of the input shaft of the gearbox. The control device is further configured to, during and/or after controlling the clutch to the open state, synchronize the rotational speed of the combustion engine to the rotational speed of the input shaft of the gearbox through control of fuel injection to the combustion engine.

The control device has the same advantages as described above with regard to the corresponding method for starting a combustion engine of a vehicle powertrain during free-wheeling with engine off.

The control device may be configured to control the clutch to the open state in response to an indication from a management system of the combustion engine that the combustion engine may be accelerated by control of fuel injection and/or in response to an indication that the rotational speed of the combustion engine has reached a predetermined rotational speed threshold value. The predetermined rotational speed threshold value may correspond to a rotational speed lower than, or equal to, the idle speed of the combustion engine.

The control device may be configured to initiate the control of the clutch to the open state is response to an indication that a predetermined condition for opening of the clutch is fulfilled. The predetermined condition for opening of the clutch may for example be based on a prediction that the torque transferred to the combustion engine during opening of the clutch is sufficient for the combustion engine to reach a state at which it may be accelerated by control of fuel injection. Alternatively, or additionally, the predetermined condition for opening of the clutch may for example be based on a prediction that the time it takes to open the clutch is sufficiently long for the combustion engine to reach a state at which the combustion engine may be accelerated by control of fuel injection.

The control device may further be configured to control the clutch to the partially closed state to a predetermined transfer torque.

The control device may further be configured to control the clutch from the open state to a closed state when the rotational speed of the output shaft of the combustion engine is synchronized to the rotational speed of the input shaft of the gearbox.

Moreover, the present disclosure relates to a vehicle comprising a vehicle powertrain. The vehicle further comprises the control device configured to start a combustion engine of a vehicle powertrain during free-wheeling with engine off as described above.

DETAILED DESCRIPTION

Figure 1:
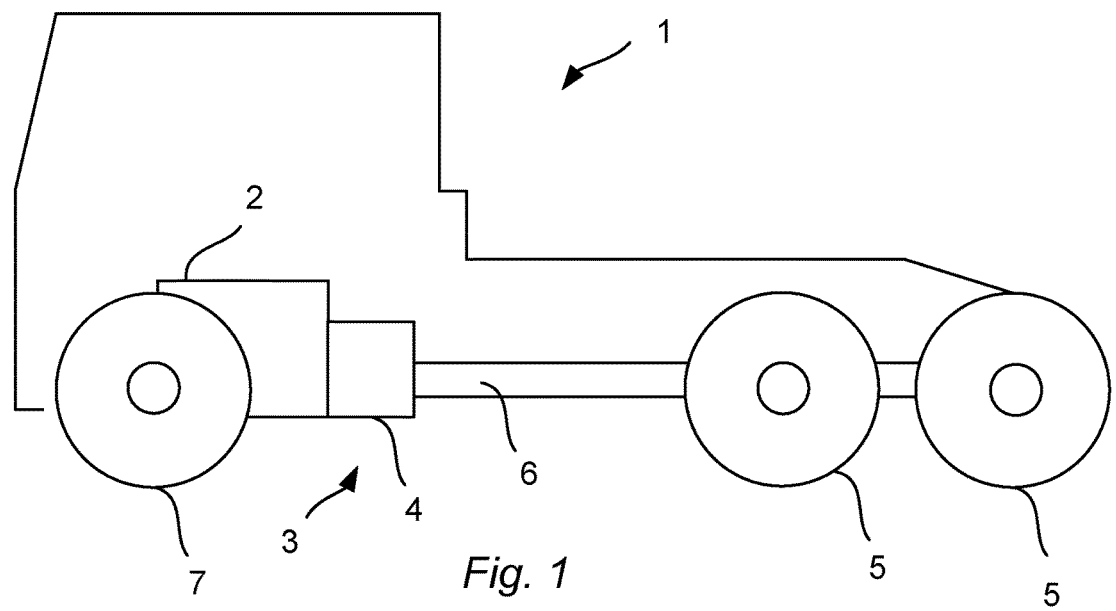
FIG. 1 schematically illustrates a side view of an example of a vehicle.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

The present disclosure provides a method for starting a combustion engine of a vehicle powertrain in conjunction with free-wheeling with engine off. In other words, the present disclosure relates to a method for starting a combustion engine when free-wheeling with engine off is to be terminated. During free-wheeling with engine off, there is no driving torque provided from any propulsion unit of the vehicle powertrain to the driving wheels. The reason for ending an operation of free-wheeling with engine off is typically that a driving torque from the combustion engine is necessary in order for the vehicle not to unintentionally lose traveling speed.

The vehicle powertrain comprises a combustion engine having an output shaft. The combustion engine may be the only propulsion unit of the vehicle powertrain. Alternatively, the vehicle powertrain may comprise one or more further propulsion units, such as an electrical machine, if desired. The vehicle powertrain further comprises a gearbox arranged to selectively transfer torque between the combustion engine and at least one driving wheel of the vehicle powertrain. The gearbox comprises an input shaft. The vehicle powertrain further comprises a clutch arranged between the combustion engine and the gearbox. The clutch is connected to the input shaft of the gearbox and to the output shaft of the combustion engine. The clutch may be a friction clutch.

The clutch may be controlled to different states. If the clutch is in an open state, the operative connection between the combustion engine and the driving wheel(s) is interrupted. When the clutch is in the completely closed state, the operative connection between the combustion engine and the driving wheel(s) is essentially rigid. In other words, the clutch is in a non-slipping state in the completely closed state. The clutch may also be controlled to various partially closed states, in which the clutch is slipping. In the partially closed state, the clutch may, depending on how much the clutch is closed, transfer different amounts of torque between the output shaft of the combustion engine and the input shaft of the gearbox. Thus, the amount of torque transferrable by a clutch may be controlled by controlling a distance between the friction plates of a friction clutch.

The method for starting a combustion engine of a vehicle powertrain in conjunction with free-wheeling with engine off comprises a step of, in response to an instruction for start of the combustion engine, controlling the clutch to a partially closed state. Thereby, the clutch transfers torque from the input shaft of the gearbox (which is in a rotating state due to the free-wheeling operation) to the output shaft of combustion engine. Thereby, the combustion engine is started. The instruction for start of the combustion engine may for example be generated by a cruise control system of the vehicle powertrain or by any other means known in the art. The instruction for start of the combustion engine may typically be generated when there is an expected future need for driving torque from the combustion engine. In other words, the instruction for start of the combustion engine is typically generated before the operation of free-wheeling with engine off is terminated.

The clutch may in the above described step be controlled to a partially closed state corresponding to a predetermined transfer torque. This can be achieved by controlling the position of the constituent components of the clutch, or, in other words, by controlling the clutch to a predetermined slippage. The predetermined transfer torque is chosen to a torque sufficient to initiate a rotation of the output shaft of the combustion engine such that the combustion engine is started. Such a torque may be determined in any previously known manner therefore, for example by measuring this torque on engines in test beds as part of the calibration for that engine type.

The method further comprises a step of controlling the clutch to the open state when the combustion engine has been started as described above, but prior to the rotational speed of the output shaft of the combustion engine has reached a rotational speed synchronized to the rotational speed of the input shaft of the gearbox. In other words, the clutch is opened before the combustion engine has reached the synchronized speed.

The step of controlling the clutch to the open state may be performed in response to an indication from a management system of the combustion engine that the combustion engine may be accelerated by control of fuel injection. Thereby, it is ensured that the clutch is not opened at a too early stage, which could otherwise result in a failure of the start of the combustion engine.

Alternatively, the step of controlling the clutch to the open state may be performed in response to an indication that the rotational speed of the combustion engine has reached a predetermined rotational speed threshold value. This may, in comparison to the alternative of controlling the clutch to an open state in response to an indication from a management system of the combustion engine, enable an earlier initiation of the opening of the clutch and thereby lower wear of the clutch. However, the reliability may be somewhat reduced compared to the formed alternative. The predetermined rotational speed threshold value may be a rotational speed value at which it is previously known that the combustion engine has a sufficient rotational speed for allowing acceleration by control of fuel injection to the combustion engine. It should be recognised that the predetermined rotational speed threshold value will be dependent of the type of combustion engine. It is well known that a combustion engine can be accelerated by control of fuel injection when at idle speed. However, a combustion engine can in general be accelerated at much lower rotational speeds by control of fuel injection. In order to reduce the wear of the clutch and the risk of loss of lateral stability as much as possible, there is a desire to open the clutch as early as possible. Therefore, the predetermined rotational speed threshold may suitably be a rotational speed lower than the idle speed of the combustion engine. By way of example, the predetermined rotational speed threshold value may be 80% or less of the idle speed of the combustion engine. In some cases, the predetermined rotational speed threshold value may even be as low as about half the idle speed of the combustion engine.

It should also be recognised that it is naturally also possible that, albeit less preferred as it in some cases may cause a delay in the opening of the clutch, the step of controlling the clutch to the open state may be performed in response to both an indication from the management system of the combustion engine and an indication that the rotational speed of the combustion engine has reached a predetermined rotational speed threshold value, if desired.

In view of the fact that control of the clutch to the different states takes some time (albeit very short), the opening of the clutch may be initiated before the combustion engine can actually be accelerated by control of fuel injection as long as the combustion engine will reach a state at which it can be accelerated by control of fuel during the time it takes to open the clutch or at the point in time at which the clutch reaches the open state. Therefore, the step of controlling the clutch to the open state may be initiated in response to an indication that a predetermined condition for opening of the clutch is fulfilled. The predetermined condition for opening of the clutch may for example be based on a prediction that the torque transferred to the combustion engine during the opening of the clutch (i.e. prior to conclusion of the opening of the clutch) is sufficient for the combustion engine to reach a state at which it may be accelerated by control of fuel injection. Such a prediction may for example be prepared in advance for any possible condition of the vehicle powertrain and stored in a look-up table for subsequent use in the method as described herein. Alternatively, or additionally, the predetermined condition for opening of the clutch may be based on a prediction that the time it takes to open the clutch from the partially closed state is sufficiently long for the combustion engine to reach a state at which it may be accelerated by control of fuel injection.

The step of controlling the clutch to the open state may suitably be performed only after an indication that a first fuel injection to the combustion engine has occurred. Thereby, it may for example be ensured that the opening of the clutch is not performed too early in the starting sequence and that the combustion engine may be accelerated by control of fuel injection.

The step of controlling the clutch to the open state is preferably performed immediately after the step of controlling the clutch to the partially closed state for the purpose of starting the combustion engine. In other words, the opening of the clutch is preferably conducted as soon as the combustion engine has reached, or is expected to reach before the clutch is in the open state, a state at which it may be accelerated by control of fuel injection.

The method further comprises a step of synchronizing the speed of the combustion engine to the speed of the input shaft of the gearbox by means of controlling fuel injection to the combustion engine. In this context, synchronizing is considered to mean that the rotational speed of the combustion engine is brought to a suitable rotational speed for enabling a smooth closing of the clutch without causing discomfort for a driver of the vehicle or risk for damage to the clutch. It is however not necessary that the combustion engine is rotating with exactly the same speed as the input shaft of the gearbox. In other words, the method comprises a step of controlling the fuel injection to the combustion engine so as to accelerate the combustion engine for the purpose of reaching a rotational speed of the combustion engine which is the same or essentially the same as the rotational speed of the input shaft of the gearbox.

The step of synchronizing the speed of the combustion engine to the speed of the input shaft of the gearbox through control of fuel injection to the combustion engine is performed after the combustion engine has started, and may be initiated before the clutch has reached the completely open state. In other words, the step of controlling the clutch to the open state and the step of synchronizing the speed of the combustion engine may be conducted simultaneously for a short duration of the starting sequence. However, during at least a portion of the step of synchronizing the speed of the combustion engine to the speed of the input shaft of the gearbox through control of fuel injection, the clutch is in the open state. Suitably, the aim is for the clutch to be in the open state during as much as possible of said step of synchronizing the speed of the combustion engine. This significantly reduces the wear of the clutch and the risk for loss in lateral stability.

In summary, the present method provides a starting sequence for the combustion engine comprising two consecutive phases. In the first initial phase, the combustion engine is started by a dragging torque from the driving wheel(s) resulting from the clutch being in a partially closed state. In the second phase, following the first phase, the clutch is in an open state and the combustion engine is accelerated by its own by controlling the fuel injection until it has reached a synchronized speed with the input shaft of the gearbox.

When the rotational speed of the combustion engine has been synchronized to the rotational speed of the input shaft of the gearbox, the clutch may be controlled from the open state to a completely closed state. Thereby, torque may be transferred from the combustion engine to the driving wheel(s) and hence propulsion of the vehicle powertrain may thereby be effectuated by means of the combustion engine when the free-wheeling with engine off operation is terminated.

Moreover, in accordance with the present disclosure, a control device configured to start a combustion engine of a vehicle powertrain in conjunction with free-wheeling with engine off is provided. The control device may be configured to perform any one of the steps described above.

More specifically, the control device configured to start a combustion engine of a vehicle powertrain during free-wheeling with engine off is configured to:

in response to an instruction to start the combustion engine, control the clutch to a partially closed state so as to transfer torque from the input shaft of the gearbox to the combustion engine, thereby starting the combustion engine, control the clutch to an open state when the combustion engine has started, but prior to the output shaft of the combustion engine has reached a rotational speed synchronized with the rotational speed of the input shaft of the gearbox, and during and/or after controlling the clutch to the open state, synchronize the rotational speed of the combustion engine to the rotational speed of the input shaft through control of fuel injection to the combustion engine.

FIG. 1 schematically illustrates a side view of an example of a vehicle 1. The vehicle 1 comprises a powertrain 3 comprising an internal combustion engine 2 and a gearbox 4. A clutch (shown in FIG. 2) may be arranged between the internal combustion engine 2 and the gearbox 4. The gearbox 4 is connected to the driving wheels 5 of the vehicle 1 via an output shaft 6 of the gearbox 4. The gearbox 4 is adapted to selectively transfer torque between the combustion engine 2 and the driving wheels 5 during operation of the vehicle. The vehicle 1 may further comprise non-driving wheels 7.

The vehicle 1 may be, but is not limited to, a heavy vehicle, e.g. a truck or a bus. Furthermore, the vehicle may be a hybrid vehicle comprising an electric machine (not shown) in addition to the internal combustion engine 2.

Figure 2:
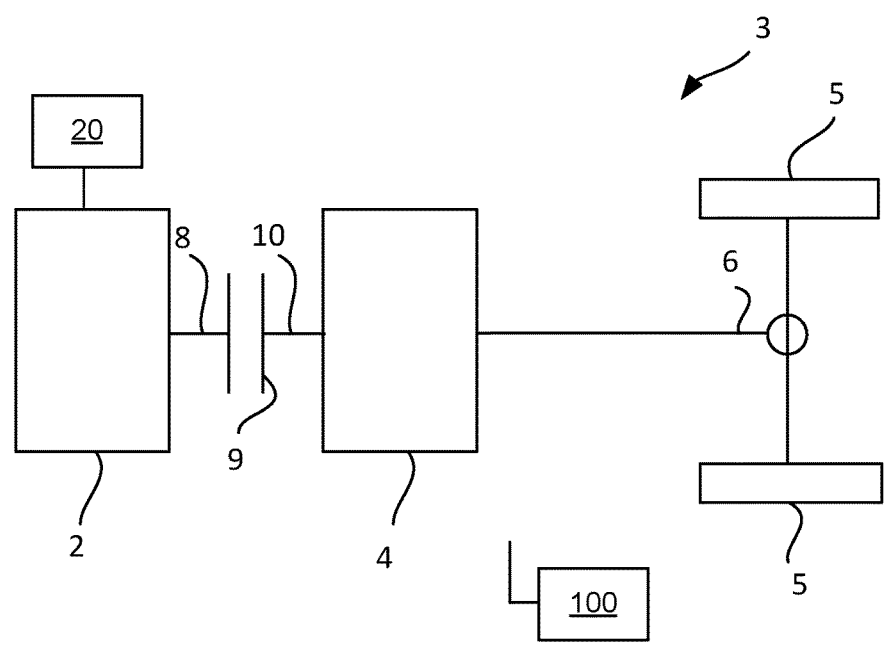
FIG. 2 schematically illustrates an example of a vehicle powertrain.

FIG. 2 schematically illustrates an exemplifying embodiment of a vehicle powertrain 3, such as a powertrain of the vehicle 1 shown in FIG. 1. The powertrain 3 comprises a combustion engine 2 having an output shaft 8. The vehicle powertrain may further comprise a management system 20 of the combustion engine 2. The powertrain 3 further comprises a gearbox 4 comprising an input shaft 10. The powertrain 3 further comprises a clutch 9 arranged between the combustion engine 2 and the gearbox 4. The clutch 9 is connected to the input shaft 10 of the gearbox and the output shaft 8 of the combustion engine. The gearbox 4 may for example be an automated manual gearbox (AMT). The clutch 9 may be a friction clutch.

The vehicle powertrain 3 furthermore comprises a control device 100, as will be described in more detail below. The control device 100 is configured to control at least a part of the powertrain. More specifically, the control device may be configured to control the clutch 9 and the combustion engine 2. The control device 100 is configured to start the combustion engine 2 during free-wheeling with engine off. The control device may optionally be configured to control further operations of the vehicle powertrain, if desired.

The control device 100 may comprise one or more control units. In case of the control device 100 comprising a plurality of control units, each control unit may be configured to control a certain function or a certain function may be divided between two or more of the control units. The control device 100 may be separate from the management system 20 of the combustion engine 2, comprise the management system 20, or be comprised in the management system 20 of the combustion engine 2, as desired.

The performance of the method for starting a combustion engine as disclosed herein may be governed by programmed instructions. These programmed instructions typically take the form of a computer program which, when executed in or by a control device, causes the control device to effect desired forms of control action. Such instructions may typically be stored on a computer-readable medium.

Figure 3:
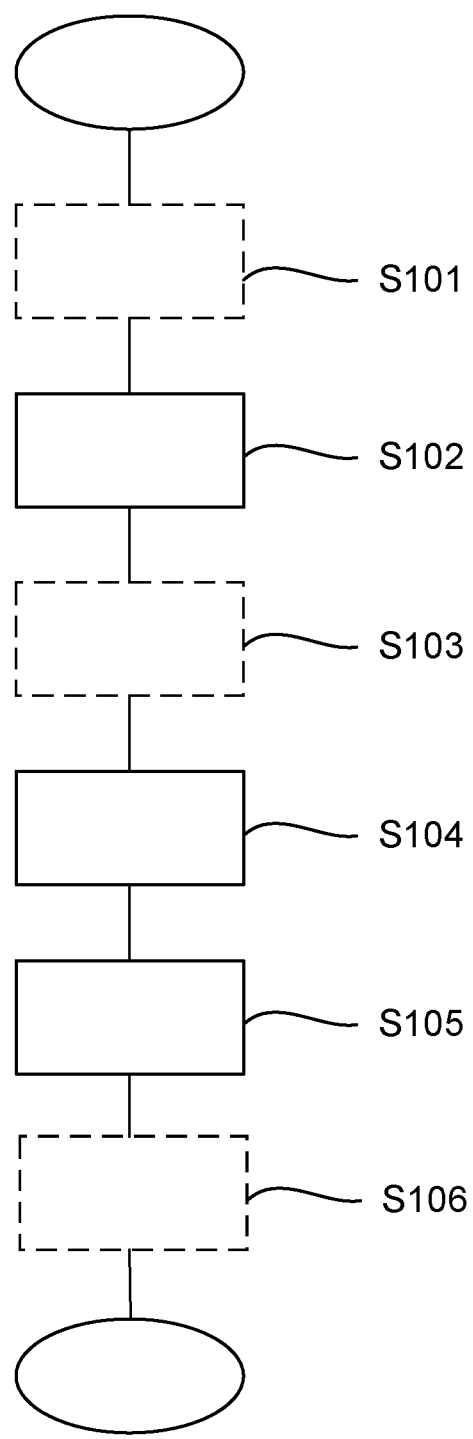
FIG. 3 represents a flowchart schematically illustrating an exemplifying embodiment of a method.

FIG. 3 represents a flowchart schematically illustrating an exemplifying embodiment of the method for starting a combustion engine of a vehicle powertrain (for example the vehicle powertrain 3 shown in FIG. 2) in conjunction with free-wheeling with engine. In FIG. 3, optional steps of the method are shown with dashed boxes. At the start of the method, the vehicle powertrain (and hence the vehicle) is in an operation mode of free-wheeling with engine off. This means for example that the input shaft of the gearbox is rotating but the output shaft of the combustion engine is in a non-rotating state or at least essentially non-rotating state.

The method may comprise an initial step S101 of determining or detecting an instruction for start of the combustion engine. The instruction for start of the combustion engine may for example be generated by a cruise control system or the like.

The method comprises a step S102 of, in response to an instruction for start of the combustion engine, controlling the clutch to a partially closed state. In the partially closed state, the clutch transfers torque from the input shaft of the gearbox to the combustion engine (more specifically to the output shaft of the combustion engine). Thereby, the combustion engine is started. The partially closed state may correspond to a state imparting a predetermined transfer torque of the clutch.

After step S102, the method may comprise a step S103 of determining that the combustion engine has started. This may be performed for example by determining an indication from a management system of the combustion engine that the combustion engine may be accelerated by control of fuel injection, or by determining an indication that the rotational speed of the combustion engine has reached a predetermined rotational speed threshold value.

The method further comprises a step S104 of controlling the clutch to an open state. Step S104 is performed when the combustion engine has been started, but prior to the output shaft of the combustion engine has reached a rotational speed synchronized with the rotational speed of the input shaft of the gearbox.

The method further comprises a step S105 of synchronizing the speed of the combustion engine to the speed of the input shaft of the gearbox through control of fuel injection to the combustion engine.

When the rotational speed of the output shaft of the combustion engine has been synchronized to the rotational speed of the input shaft of the gearbox, the method may comprise a step S106 of controlling the clutch to a completely closed state. Thereby, the torque generated by the combustion engine may be fully utilised to drive the driving wheels of the vehicle powertrain. In other words, the operation mode of free-wheeling with engine off is terminated.

Figure 4:
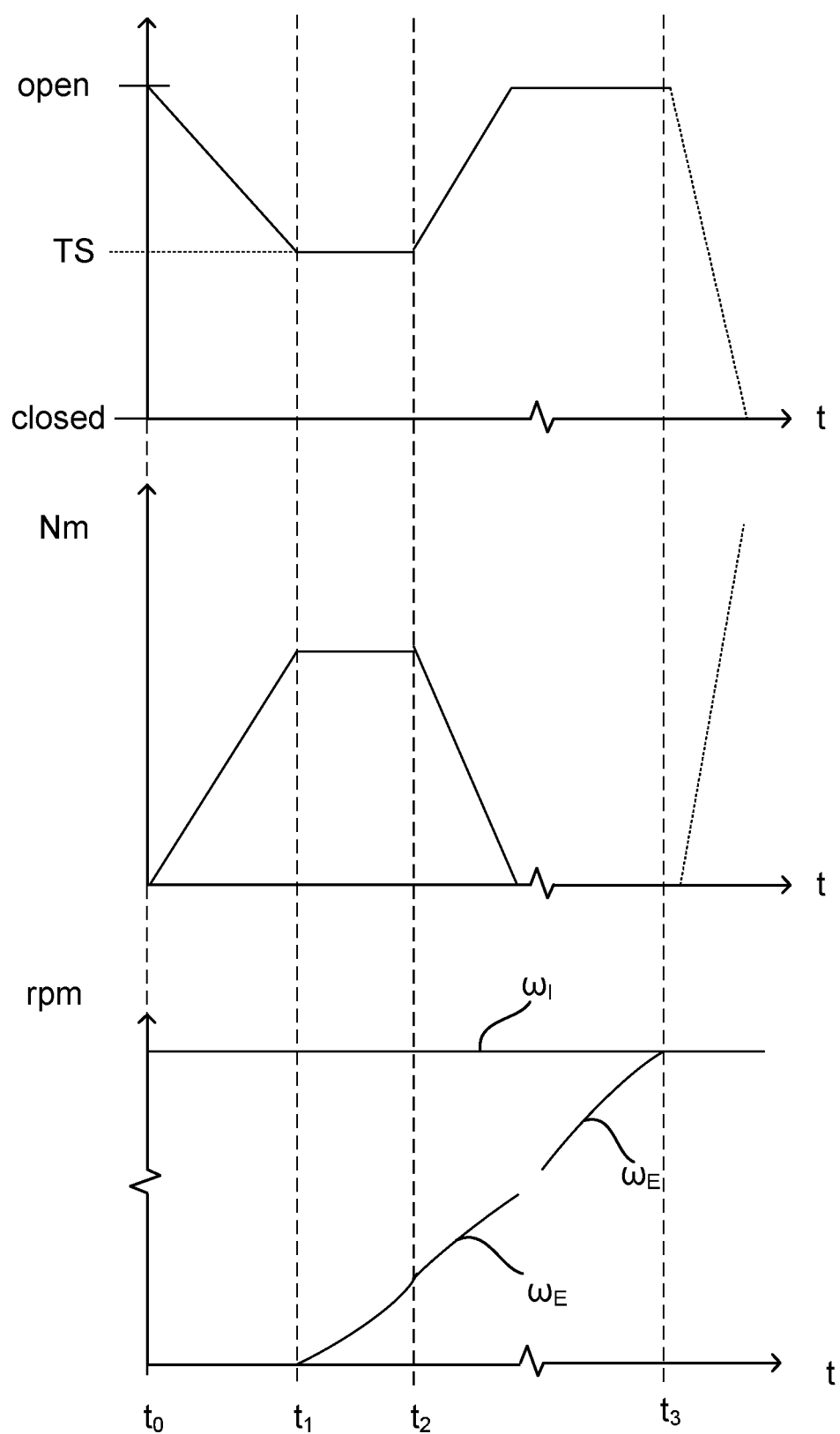
FIG. 4 schematically illustrates the result of the steps of the method according to the present disclosure over time.

FIG. 4 schematically illustrates the result of the steps of the method according to the present disclosure over time t. The top drawing represents the state of the clutch, which can be varied between a closed state and an open state. The middle drawing represents the torque transferred by the clutch to the combustion engine. The bottom drawing represents the rotational speed $\omega_E$ of the combustion engine, and the rotational speed $\omega_I$ of the input shaft of the gearbox, respectively.

At a first point in time, $t_0$, the combustion engine is in a non-rotating state and the control of the clutch, in response to an instruction for start of the combustion engine, to a partially closed state is initiated. The torque transferred by the clutch will increase as a result of the change of state of the clutch (se shown in the middle drawing). At a second point in time, $t_1$, the clutch has reached a partially closed state (as shown in the top drawing), such as a target partially closed state TS. The combustion engine will thereby start rotating (as shown in the bottom drawing) as a result of the transferred torque. At a third point in time, $t_2$, the combustion engine has been started and can be accelerated by control of the fuel injection. The rotational speed of the combustion engine has at $t_2$ however not yet reached a rotational speed synchronized with the rotational speed of the input shaft of the gearbox (as shown in the bottom drawing). At $t_2$, the control of the clutch to the open state is initiated (as shown in the top drawing) and the torque transferred by the clutch to the combustion engine will therefore start to decrease (as shown in the middle drawing). The opening of the clutch to the open state is preferably made as quickly as possible. Between $t_2$ and a fourth point in time, $t_3$, the combustion engine is accelerated by means of control of the fuel injection to the combustion engine. At the fourth point in time, $t_3$, the rotational speed of the combustion engine has been synchronized to the rotational speed of the input shaft of the gearbox (as shown in the bottom drawing) and the clutch can be controlled from the open state to the completely closed state (shown by dotted line in top drawing) so that the torque generated by the combustion engine can be transferred to the driving wheels. If the clutch is controlled to the completely closed state after $t_3$, the torque transferred by the clutch will increase (as shown by the dotted line in middle drawing).

Figure 5:
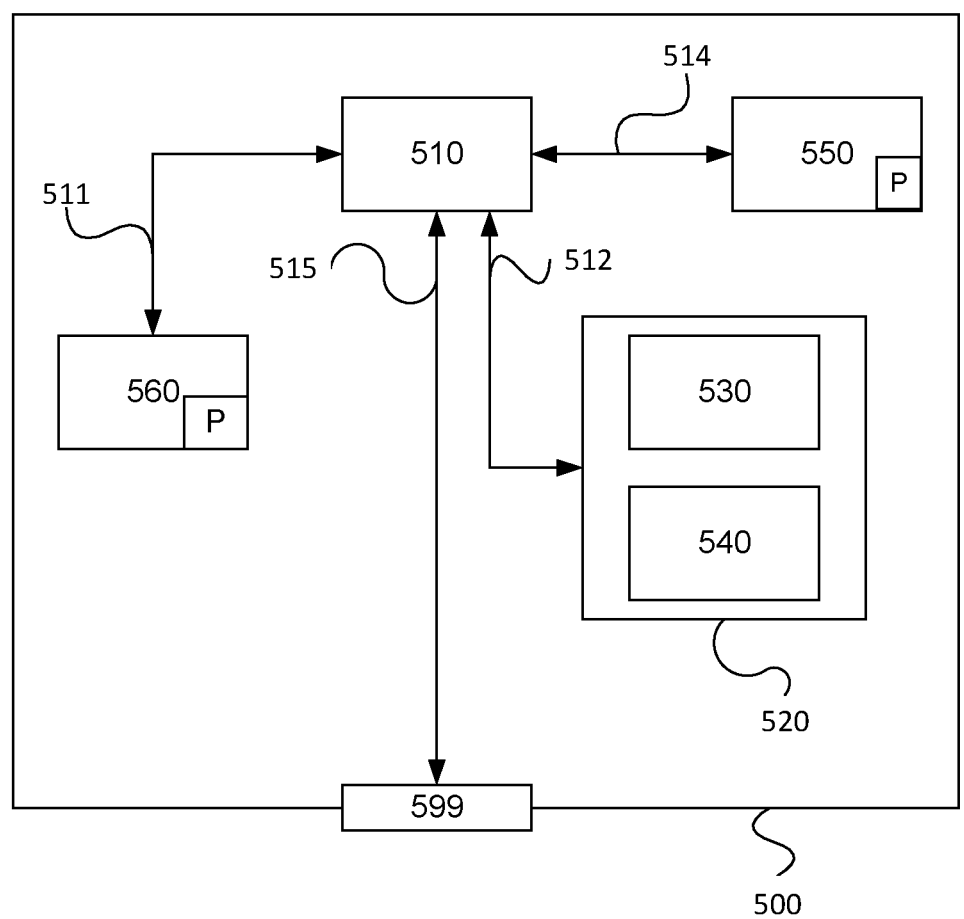
FIG. 5 schematically illustrates a device that may constitute, comprise or be a part of a control device configured to start a combustion engine of a vehicle powertrain during free-wheeling with engine off.

FIG. 5 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises routines for starting a combustion engine of a vehicle powertrain during free-wheeling with engine off. The vehicle powertrain comprises a combustion engine comprising an output shaft. The vehicle powertrain further comprises a gearbox arranged to selectively transfer torque between the combustion engine and at least one driving wheel. The gearbox comprises an input shaft. The vehicle powertrain further comprises a clutch arranged between the combustion engine and the gearbox. The clutch is connected to the input shaft of the gearbox and the output shaft of the combustion engine. The computer program comprises routines/instructions for, in response to an instruction for starting the combustion engine, controlling the clutch to a partially closed state so as to transfer torque from the input shaft of the gearbox to the combustion engine, thereby starting the combustion engine. The computer program further comprises routines/instructions for, when the combustion engine has started but prior to the output shaft of the combustion engine has reached a rotational speed synchronized with the rotational speed of the input shaft of the gearbox, controlling the clutch to an open state. Moreover, the computer program comprises routines/instructions for synchronizing the speed of the combustion engine to the speed of the input shaft of the gearbox through control of fuel injection to the combustion engine.

The program P may be stored in an executable form or in a compressed form in a memory 560 and/or in a read/write memory 550.

The data processing unit 510 may perform certain functions. For example, the data processing unit 510 may effect a certain part of the program stored in the memory 560 or a certain part of the program stored in the read/write memory 550.

The data processing device 510 can communicate with a data port 599 via a data bus 515. The non-volatile memory 520 may be intended for communication with the data processing unit 510 via a data bus 512. The separate memory 560 may be intended to communicate with the data processing unit 510 via a data bus 511. The read/write memory 550 may be adapted to communicate with the data processing unit 510 via a data bus 514.

When data are received on the data port 599, they may be stored temporarily in the second memory element 540. When input data received have been temporarily stored, the data processing unit 510 may be prepared to effect code execution according to a computer program comprising program code for causing a control device to perform the method (or parts thereof) for controlling a braking system for a vehicle as described herein.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method for starting a combustion engine of a vehicle powertrain during free-wheeling with the combustion engine off, the method being performed by a control device, said vehicle powertrain comprising: the combustion engine comprising an output shaft, a gearbox arranged to selectively transfer torque between the combustion engine and at least one driving wheel, the gearbox comprising an input shaft, and a clutch arranged between the combustion engine and the gearbox, the clutch connected to the input shaft of the gearbox and the output shaft of the combustion engine, said method comprising the steps of:

in response to an instruction for start of the combustion engine, controlling the clutch to a partially closed state so as to transfer torque from the input shaft of the gearbox to the combustion engine, thereby starting the combustion engine;

when the combustion engine has started, but prior to the output shaft of the combustion engine having reached a rotational speed synchronized with a rotational speed of the input shaft of the gearbox, controlling the clutch to an open state; and synchronizing a speed of the combustion engine to the speed of the input shaft of the gearbox through control of fuel injection to the combustion engine.

2. The method according to claim 1, wherein the step of controlling the clutch to the open state is performed in response to an indication from a management system of the combustion engine that the combustion engine may be accelerated by control of fuel injection.

3. The method according to claim 1, wherein the step of controlling the clutch to the open state is performed in response to an indication that the rotational speed of the combustion engine has reached a predetermined rotational speed threshold value.

4. The method according to claim 3, wherein the predetermined rotational speed threshold value corresponds to a rotational speed lower than, or equal to, an idle speed of the combustion engine.

5. The method according to claim 1, wherein the step of controlling the clutch to the open state is initiated in response to an indication that a predetermined condition for opening of the clutch is fulfilled.

6. The method according to claim 5, wherein the predetermined condition for opening of the clutch is based on a prediction that a torque transferred to the combustion engine during opening of the clutch is sufficient for the combustion engine to reach a state at which it may be accelerated by control of fuel injection.

7. The method according to claim 5, wherein the predetermined condition for opening of the clutch is based on a prediction that a time it takes to open the clutch is sufficiently long for the combustion engine to reach a state at which the combustion engine may be accelerated by control of fuel injection.

8. The method according to claim 1, wherein the step of controlling the clutch to the partially closed state is performed to a predetermined transfer torque.

9. The method according to claim 1, wherein the step of controlling the clutch to the open state is performed after an indication that a first fuel injection to the combustion engine has occurred.

10. The method according to claim 1, further comprising:
when the rotational speed of the output shaft of the combustion engine is synchronized to the rotational speed of the input shaft of the gearbox, controlling the clutch from the open state to a closed state.

11. A non-transitory computer-readable medium comprising program instructions stored thereon for starting a combustion engine of a vehicle powertrain during free-wheeling with the combustion engine off, said vehicle powertrain comprising: the combustion engine comprising an output shaft, a gearbox arranged to selectively transfer torque between the combustion engine and at least one driving wheel, the gearbox comprising an input shaft, and a clutch arranged between the combustion engine and the gearbox, the clutch connected to the input shaft of the gearbox and the output shaft of the combustion engine, said program instructions configured to cause one or more control devices to perform the following operations:

in response to an instruction for start of the combustion engine, controlling the clutch to a partially closed state so as to transfer torque from the input shaft of the gearbox to the combustion engine, thereby starting the combustion engine;

when the combustion engine has started, but prior to the output shaft of the combustion engine having reached a rotational speed synchronized with a rotational speed of the input shaft of the gearbox, controlling the clutch to an open state; and synchronizing a speed of the combustion engine to the speed of the input shaft of the gearbox through control of fuel injection to the combustion engine.

12. A control device configured to start a combustion engine of a vehicle powertrain during free-wheeling with engine off, said vehicle powertrain comprising: the combustion engine comprising an output shaft, a gearbox arranged to selectively transfer torque between the combustion engine and at least one driving wheel, the gearbox comprising an input shaft, and a clutch arranged between the combustion engine and the gearbox, the clutch connected to the input shaft of the gearbox and the output shaft of the combustion engine, wherein the control device is configured to:
in response to an instruction for start of the combustion engine, control the clutch to a partially closed state so as to transfer torque from the input shaft of the gearbox to the combustion engine, thereby starting the combustion engine;

control the clutch to an open state when the combustion engine has started, but prior to the output shaft of the combustion engine having reached a rotational speed synchronized with a rotational speed of the input shaft of the gearbox; and during and/or after controlling the clutch to the open state, synchronize a rotational speed of the combustion engine to the rotational speed of the input shaft of the gearbox through control of fuel injection to the combustion engine.

13. The control device according to claim 12, wherein the control device is configured to control the clutch to the open state in response to an indication from a management system of the combustion engine that the combustion engine may be accelerated by control of fuel injection and/or in response to an indication that the rotational speed of the combustion engine has reached a predetermined rotational speed threshold value.

14. The control device according to claim 12, wherein the control device is configured to initiate the control of the clutch to the open state is response to an indication that a predetermined condition for opening of the clutch is fulfilled.

15. The control device according to claim 12, wherein the control device is configured to control the clutch to the partially closed state to a predetermined transfer torque.

16. The control device according to claim 12, further configured to control the clutch from the open state to a closed state when the rotational speed of the output shaft of the combustion engine is synchronized to the rotational speed of the input shaft of the gearbox.

17. A vehicle comprising a vehicle powertrain, the vehicle further comprising a control device, said control device configured to start a combustion engine of the vehicle powertrain during free-wheeling with engine off, said vehicle powertrain comprising: the combustion engine comprising an output shaft, a gearbox arranged to selectively transfer torque between the combustion engine and at least one driving wheel, the gearbox comprising an input shaft, and a clutch arranged between the combustion engine and the gearbox, the clutch connected to the input shaft of the gearbox and the output shaft of the combustion engine, wherein the control device is configured to:
        in response to an instruction for start of the combustion engine, control the clutch to a partially closed state so as to transfer torque from the input shaft of the gearbox to the combustion engine, thereby starting the combustion engine;
        control the clutch to an open state when the combustion engine has started, but prior to the output shaft of the combustion engine having reached a rotational speed synchronized with a rotational speed of the input shaft of the gearbox; and
        during and/or after controlling the clutch to the open state, synchronize a rotational speed of the combustion engine to the rotational speed of the input shaft of the gearbox through control of fuel injection to the combustion engine.

\* \* \* \* \*